E. G. Ament,
Capstan.

Nº 44,268.        Patented Sep. 13, 1864.

Witnesses:
James H. Cormack
W. M. Bates

Inventor:
Edward G. Ament

UNITED STATES PATENT OFFICE.

EDWARD G. AMENT, OF OSWEGO, ILLINOIS.

IMPROVEMENT IN PORTABLE CAPSTANS.

Specification forming part of Letters Patent No. 44,268, dated September 13, 1864.

*To all whom it may concern:*

Be it known that I, EDWARD G. AMENT, of Oswego, in the county of Kendall, in the State of Illinois, have invented certain new and useful Improvements in Portable Capstans; and I do hereby declare that the following is a full and exact description thereof, reference being had to the accompanying drawings, which form a part of this specification, in which—

Figure 1:
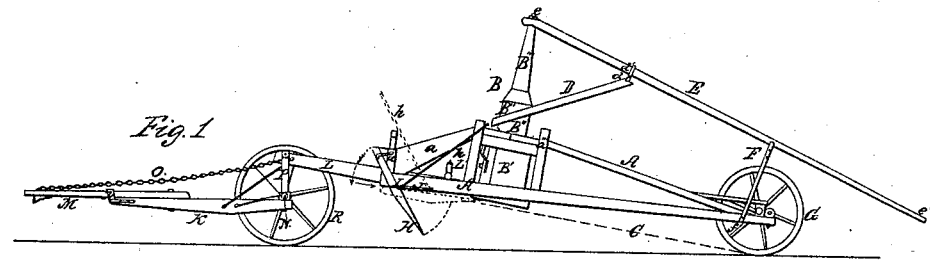
Figures 2, 3:
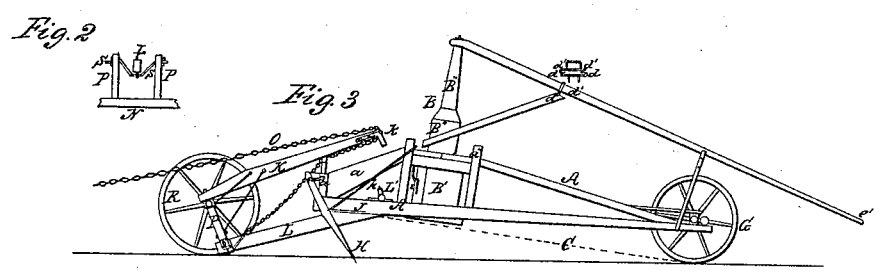
Figure 4:
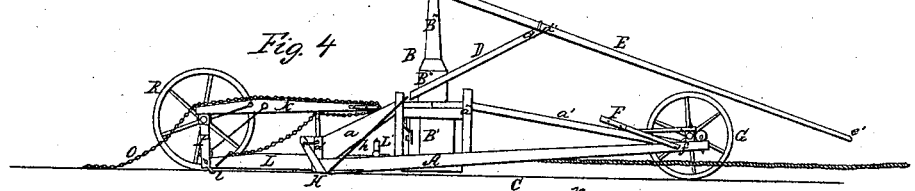
Figure 5:
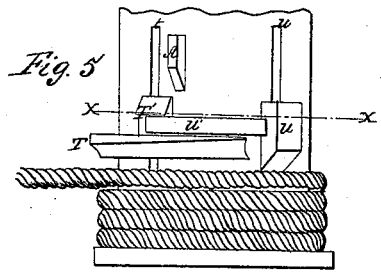
Figure 6:
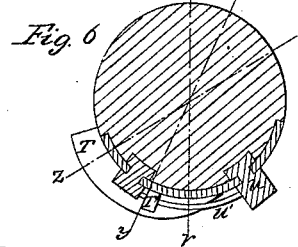
Figure 7:
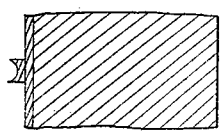
Figure 8:
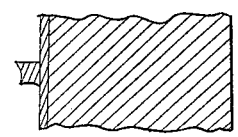
Figure 9:
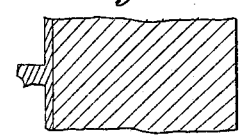

Figure 1 is a side elevation of the machine while properly adjusted for short or long journeys. Fig. 2 is a front elevation of a small portion thereof, serving to show the peculiar connection between the body and the forward axle. Fig. 3 is a side elevation of the machine when properly adjusted for work, and at a time when the machine is first lowered, and at an instant when the oxen are to be unhitched from the chain on the tongue and hitched to the end of the sweep. Fig. 4 is a side elevation of the machine when the anchors are in the earth, and if the spool had all the rope, or nearly so, the oxen were then to be unhitched from the sweep and hitched to the chain on the tongue. Figs. 5, 6, 7, 8, and 9 represent on a larger scale the mechanism by which the rope is properly disposed upon the spool. Fig. 5 is a side elevation of the part of the spool which is receiving the rope. Fig. 6 is a horizontal section on the line X X in Fig. 5. Fig. 7 is a vertical section on the line V V in Fig. 6. Fig. 8 is a vertical section on the line Y Y in Fig. 6. Fig. 9 is a vertical section on the line Z Z in Fig. 6.

Similar letters of reference indicate like parts in all the drawings.

To enable others skilled in the art to make and use my invention, I will proceed to describe its construction and operation by reference to the drawings, and to letters of reference marked thereon.

A A, &c., represent the framing of the construction, which is adapted to support the spool shaft B in a position nearly or quite perpendicular to a line, C, drawn from the bottoms of the hind wheels to the bottom of the forward end of the body of the capstan or frame A, as represented.

D is a wrench or grip securely fixed upon the spool head B'', and is provided with a double catch, $d$, to receive a corresponding reversed double catch, $d'$, upon the sweep or lever E, which lever is connected to the top of the spool-shaft B by a pin and gudgeon, $e$. The legs of the lever-standard F are bolted to each side of one of the sills, a little forward of the hind axle, and is permitted to move in a vertical plane radial to the axis of the bolt $f$, by which they are so held together. A short piece is securely held between and far enough below their upper ends to form an inverted arch or crotch, by which the lever is securely held in its place when carried thereby. The lever E rests upon the lever-standard F, when it is not necessary to have the double catches $d$ and $d'$ in contact for the purpose of rotating the spool-shaft B, but when it is necessary to operate the spool-shaft B the lever-standard F, not required for use, is fallen forward and rests upon the rear brace $a'$ of the frame A, and the lever E then rests upon the end of the grip D, where, by means of the double catches $d$ and $d'$, is securely held in contact therewith.

B''' is a spire erected or continued upon the spool-head B'' of the spool-shaft B, for the purpose of placing the point of draft $e'$ at the proper height or pitch. The rear axle forms a part of the frame A. The rear end is therefore only permanently supported on the rear wheels, G G. The forward end of the frame A is provided with stout and broad anchors H, strongly braced and held thereto. These perform the usual function of such implements. They are held and braced to the frame A by means of the stirrups $h$ and braces $a$. Their bite is attained by setting them at proper position or angle relative to the line C, surveyed from the bottoms of the hind wheels to the bottom of the forward end of the frame A. They are also by means of eyebolts and pivoting-pins or bolts pivoted at I, near the bottom of the sills of the frame A, and are thereby held to move in a manner represented by the dark arrow and dotted circular lines, Fig. 1. Said eyebolts are fixed through the anchors in a direction perpendicular to their straight faces or palm-planes, one each side of the sill, and at a point equidistant, or nearly so, from their upper and lower ends. The said pivoting-pins pass horizontally through the eyes of these eyebolts and through corresponding eyes or holes in the lower ends of the stirrups $h$, and also through a slot, J. The slot J extends a suitable distance along in the bottom of the sill of the frame A, and provides for further adjustment of the anchors H, as, when brought to a position parallel to the longitudinal lower plane or surface of the sill, moving them in the direction indicated by the dark arrow, they may be shoved back toward the rear end of the machine, or in the direction indicated by the red arrow, where they will be out of the way of the forward wheels and entirely secured from the unevenness of the road while journeying. (Observe red lines, Fig. 1.) The stirrups thrown forward recline upon a sort of frame erected upon the front cross-piece, $a''$, of the frame A, which serves to hold up the tongue when folded over upon the forward end of the frame A, as represented in Figs. 3 and 4. The anchors H, while anchoring in the ground, breast themselves against the front cross-piece, and by means of the front braces and stirrups, $h$, with other proximate parts of the frame A, are well secured from any misadjustments.

It will be observed that to have the anchors perform their office the front end of the machine must be raised and lowered; that the forward end must alone be raised up and let down, which when so operated, the whole of the body of the capstan will move in a vertical plane radial to the longitudinal center of the rear axle. Therefore to so operate this end of the machine that the anchors may at one time be entirely free from contact with the earth and at another time deeply embedded therein, I employ the devices or parts of the construction now to be described.

K is the tongue; L, the second tongue; L', the roller to which it is fixed, and M is the top tongue; N, the forward axle; P P, two posts; and R R, the forward wheels. The axle, tongue, and forward posts are fixed very rigidly together. An eyebolt, $l$, is fixed vertically in the forward end of the second tongue, L, in the manner represented, and adapted to receive the bail or cranked shaft S, the ends of which latter are supported in holes through the upper ends of the posts P P. This inverted bail or cranked shaft S is free to turn in these holes, and thus to allow considerable play between the forward end of the second tongue and the upper ends of the posts P P, in a manner which will be obvious. The forward end of the second tongue, L, being connected to the crank-shaft by means of the eyebolt $l$, as represented, it is easy to turn or cramp this forward part of the wagoning of the capstan either way so far that the wheels may rub against the side of the second tongue, L. Both ends, or, in other words, the bearings, of the roller L' are carried in boxes fixed upon the sills of the frame A. The second tongue being rigidly fixed thereto, it is adapted to move in a vertical plane radial to the longitudinal center thereof between the earth and the front cross-piece of the frame A, as represented. The top tongue, M, is used while journeying, but it, however, is disinserted while the machine is at work, and a chain, O, attached by a clevis to the end of the second tongue, passing through a bow or guide, $k$, and over a little pulley, $k'$, fixed therein, situated at the end of the tongue K, is then all the attachment by which the oxen are hitched to the forward part of the wagoning of the capstan. It will now be seen that when the parts of the capstan are adjusted, as represented in Fig. 1, the anchors are entirely free from contact with the earth.

When it is desired to station the machine for draft, the top tongue, M, is disinserted and the outer end of the chain O passed through the guide $k$, in place of the top tongue with the oxen hitched thereto. With the rear end of the draft-rope attached to the object to be moved, the oxen are driven forward until the whole length of the draft-rope, or a part thereof, is suspended between said object to be moved and the spool B', at which period the oxen stop, and while backing up the tongue K rises, and by reason of the cranked form of the swivel bearing or connection S and the operative condition of the second tongue L, as previously described, is allowed to fold over toward and upon the forward part of the machine, where it can have no interference with the sweep of the lever E, Figs. 3 and 4. The oxen are then unhitched from the chain O, and attached to the lever E at $e'$, a few rounds with which insures a sufficient rearward strain upon the machine to embed the anchors deeply and firmly, Fig. 4.

It will be observed that, while the parts of the machine are in the position shown in Fig. 3, the anchors stand with their bit ends upon the ground supporting the forward part of the body of the capstan, and the second tongue L is fallen to the ground with the connection S and posts P P, and the tongue K rests upon the front part of the frame A, as represented; whereas if the second tongue L was bolted firmly to the front cross-piece, $a''$, and a straight bolt used instead of the inverted bail or cranked shaft S, the tongue K would fold over on the machine only when the anchors H were deeply embedded in the ground, and the latter would require to be embedded by other means, because the upright position of the tongue K would prevent the lever E from rotating until this had been effected.

When it is desired to elevate the capstan and to disengage the anchors from contact with the earth, the oxen, unhitched from the lever E and attached to the end of the chain O, their draft is exerted in raising the machine by the aid of the leverage due to the difference in length of the lever or tongue K and the posts P P. When the tongue K has been drawn over forward down to its horizontal position, Fig. 1, the anchors are then cleared from the earth, and the capstan may be moved forward freely, the suspension of the draft-rope, where it may be stationed for another draft.

Having thus described the mechanism by which the forward end of the body of the capstan is raised and lowered, and thus also the means by which the anchors perform their office, it will be easy to observe that successive drafts may be made by a repetition of the operation just described.

I overcome the difficulties heretofore experienced in properly disposing of the rope on the spool B' by means of a wedge-like rope-turner introduced at the proper period under the rope.

It will be obvious that a very great length of rope cannot be coiled on the spool in a single layer of coils. It is desirable in practice to use rope enough to form nearly or quite two complete layers. The first layer is commenced with a coil near the bottom, and as the spool is rotated coils are successively formed above it until the space designed to receive the rope is nearly covered. The rope must now by some means be caused to mount upon itself in order to commence the second layer of coils, which is, of course, commenced with a coil at or near the top of the inner layer, and formed by adding successive coils below. To cause the rope to properly terminate the first layer of coils and commence the second, I employ the mechanism now to be described.

T is a block or mass of metal adapted to slide vertically in the slot $t$. This slot is undercut or dovetailed, so as to retain the block and allow it to slide freely up and down on the surface of the spool B'. The interior face of the block T is, with the exception of the part which fits in the slot, curved to fit fairly to the general cylindrical exterior of B'. The outer face of T is of a width about equal to the diameter of the rope, and is so related to the inner face that the entire block T is wedge-formed, so that it receives the rope on its thin end and holds it gradually outward from B'. When the diameter of the spool B' at that point has been practically enlarged to an extent a little greater than the thickness of the layer of rope, the rope comes upon a portion of the exterior of the block T, which is of the form shown in section in Fig. 9, and allows the rope to be laid smoothly and quietly upon the last preceding coil. The further rotation of the spool B' now causes the second layer of rope to be laid by coils accumulating each under the last in the manner already intimated.

In order to hold the block T at the right elevation on the spool, and cause it to be applied at the right moment in precisely the right position, I have devised the additional parts represented. U is a block of metal adapted to slide vertically in the dovetailed, or otherwise properly prepared, slot $u$. U' is a spring arm or latch extending toward the block T, and adapted to seize and hold the same by catching under the shoulder T'. The lower end of the block U is beveled, as represented, and in laying its coils the rope acts on the bevel and elevates it, and by the end of the spring-arm U' and the shoulder T' elevates to an equal extent the block T and its attachments. This action progresses until the proper height has been reached, at which point the spring arm U' comes out of contact with the shoulder T by meeting the inclined piece $r$, which is fixed on the spool in the position represented. So soon as the block T and its attachments have been thus detached from their connection with the starting-block U and its attachments, it falls and rests fairly and closely upon the coil of rope last laid, so that it is exactly in the right position to receive and turn the next succeeding coil in the manner just described. If the block T were not thus movable, but was fixed in any given position in the slot $t$, it would be difficult to determine its right position. The diameter of the rope changes by the moisture of the air, and by the continual wear and stretch incident to its use, so that such a fixed position if adjusted with perfect accuracy at one time, would become wrong at a later period, and by receiving the rope in a false position it would be liable to cut it. My invention, by elevating it in the manner described, and releasing it at the proper height, so that it rests by gravity fairly on the last coil, whether the upper surface of the last coil be a little higher or lower than is expected, avoids the difficulty referred to. The upper end of the block T is beveled, as represented, so that on the discharge of the rope from the machine both the blocks T and U in settling back to their original positions in the lower ends of their respective slots, become attached again, the spring arm U' sliding down and catching under the shoulder T'.

It will be obvious that the length of the slots $t$ $u$ need not be so great as is represented in order to fulfill the duties very perfectly, and with any given length of rope; also, that the detacher $r$ may be made adjustable, so as to detach the rope-turner T and induce a commencement of the second layer of coils at various heights, if desired.

I will in this place mention a few items which might not readily suggest themselves to the manufacturer, and which have not been manifested in any other place. First, the means by which I attach the draft-rope to the spool B' is by a hook of proper dimensions jointed to a bolt or shank, not free jointed, however, nor linked, but jointed in a manner that will allow the hook to only play in a horizontal plane, the shank inserted through the center of the spool near the bottom of the part designed to receive the rope, with the nut on the other end of which so deeply sunk below the surface that it will not interfere with the rope; second, I insert a round-headed screw-bolt of proper size into the lower end of the longitudinal center of the spool-shaft B, which latter then stands thereon, and the only friction then due to the rotation of said spool-shaft is that which exists in its respective journals or collar-bearings, and the round head of said bolt turning in a sort of step fixed to the under side of the lower spool-plates; third, I make use of thin metallic collars for bushing or lining to the collar-bearings, which thereby facilitates the use of a more convenient lubricative material, and which prevents a creaking noise that is sometimes almost insupportable; fourth, I make use of stay-rods fixed diagonally in the rear part of the frame A and suspended from the upper ends of the rear posts, $a'''$ to places situated in the rear axle, a little above the sills, which help to prevent any racking of the frame A or body of the capstan.

In the full-sized machine the body of the capstan or frame A is four feet in width, the forward wheels four feet high, and the hind ones three and one-half feet high; their tire six inches wide.

The scale upon which Figs. 1, 2, 3, and 4 were drawn is one-fortieth of an inch to the inch, and the scale by which Figs. 5, 6, 7, 8, and 9 were drawn is four times as large as the former.

Some of the advantages due to certain features of my invention may be enumerated as follows: First, by reason of the manner described of attaching the body of the capstan to the axle-trees, and of its being adapted to move in a vertical plane, radially to the longitudinal center of the rear axle, as and for the purpose indicated, I am able to make use of larger wheels, and a cheaper and more simplified construction of the machine, and to realize greater strength therefrom than with capstans before known; second, by having the anchorage only at the forward end of the body of the capstan, it requires that only the forward end be raised and lowered, and by reason of this I am able to anchor the machine to the earth, and afterward to disengage it therefrom with greater facility and less time than it has been possible to do with capstans before known; third, by reason of the tongue K, chain O, guide and pulley $k$ $k'$, cranked shaft or swivel-bearing S $l$, posts P P, and second tongue L, arranged to serve in the manner described, I am able to raise and lower the capstan with less labor and with less time than before, and to fold the tongue K over upon the forward end of the frame A or body of the capstan, so as to lie entirely below the sweep of the lever E, whether the anchors H are deeply embedded in the earth or are standing only with their bit ends thereon, or are in any intermediate position; fourth, by reason of my spool-spire $B'''$, and ascending projection of the grip D, arranged to serve in connection with the lever E, as described, I am able to make a low pitch for the draft at the end of the lever E, and also to facilitate the use of larger wheels; fifth, by reason of my lever-standard F, catches $d$ and $d'$, and pin and gudgeon-joint $e$, adapted to serve with the lever E, as described, I am able to operate the machine, and at the same time allow the lever to retain its position upon the spool shaft B, with only the necessity of raising and lowering the outer end to and from the lever-standard F, under circumstances that will be obvious, thus preventing the necessity of taking off the lever, and afterward to replace it again, which thereby saves much time and a good deal of hard labor; sixth, by reason of having the adjustment of the anchors so constructed that they may be changed from the first position to the second, as convenience may suggest, I am able to secure them from the unevenness of the road while journeying in a manner that will prevent many perplexing delays, and sometimes very expensive repairs; seventh, by reason of the oblique position of my spool-shaft B, which is erected perpendicularly, or nearly so, to the line C, I am able to operate the draft-rope properly without lowering the rear end of the frame A, and consequently without the labor of raising it again when it becomes necessary to move the machine; eighth, by reason of my rope-turner T having the form described and allowed to receive and throw over upon the outside of one coil the succeeding coil, as described, I am able to change from the first to the second series or layer of coils without any wear or destruction to the rope; ninth, by reason of my rope-turner T, slot $t$, catch $T'$, bevel-block U, slot $u$, latch or spring-arm $U'$, and the latch-lifter $r$, arranged as represented, I make my rope-turner self-applying and self-adjusting, so that whether the rope be large or small the turner will, when such a number of coils have been wound on as covers the spool to about the proper height, drop upon and lie in contact with the last coil, so as to receive the rope fairly and to turn it properly over upon the last coil without any labor, risk, or care on the part of the attendant.

Having now fully described my improvements, what I claim as my invention, and desire to secure by Letters Patent, is—

1. Attaching the body of the capstan to the axle-trees in the manner and adapting it to move in a vertical plane radially to the longitudinal center of the rear axle, substantially as and for the purpose herein set forth.

2. The combination of the guide and pulley $k$ $k'$ with the tongue K and chain O, or its equivalent, and the top tongue, M, substantially as and for the purpose herein set forth.

3. The combination of the swivel-bearing S $l$ with the post P P, employed substantially as and for the purpose herein set forth.

4. The employment of the second tongue L, an otherwise rigid bearer, in combination with the forward part of the frame A, substantially as and for the purpose herein set forth.

5. The combination of the tongue K, chain O, or its equivalent, and guide and pulley $k$ $k'$ with the swivel-bearing S $l$ and posts P P, and with the second tongue L, substantially as and for the purpose herein set forth.

6. Pivoting the adjustable anchors H H and stirrups $h$ to the sills of the frame A, in connection with the slot J, or its equivalent, substantially as and for the purpose herein set forth.

7. The lever-standard F, in combination with the lever E, catches $d\ d'$, pin and-gudgeon connection $e$, and spool-spire $B'''$, as and for the purpose herein set forth.

8. In combination with the operative parts of a portable capstan, the rope-turner T, formed substantially as described, and adapted to receive and carry outward the rope and to lay it over upon the next preceding layer of coils, substantially in the manner and for the purpose herein set forth.

9. A self-operating mechanism composed of a rope-turner, T, and catch T', adapted to move longitudinally upon the spool $B'$ and to be automatically put in operation at the proper time, substantially as and for the purpose herein set forth.

EDWARD G. AMENT.

Witnesses:
W. M. BATES,
JAMES S. McCORMACK.